Sept. 7, 1948. E. N. FALES 2,448,966
CONTROL OF VORTEX FLOW BY PRESSURE WAVES
Filed Nov. 19, 1941 4 Sheets-Sheet 2
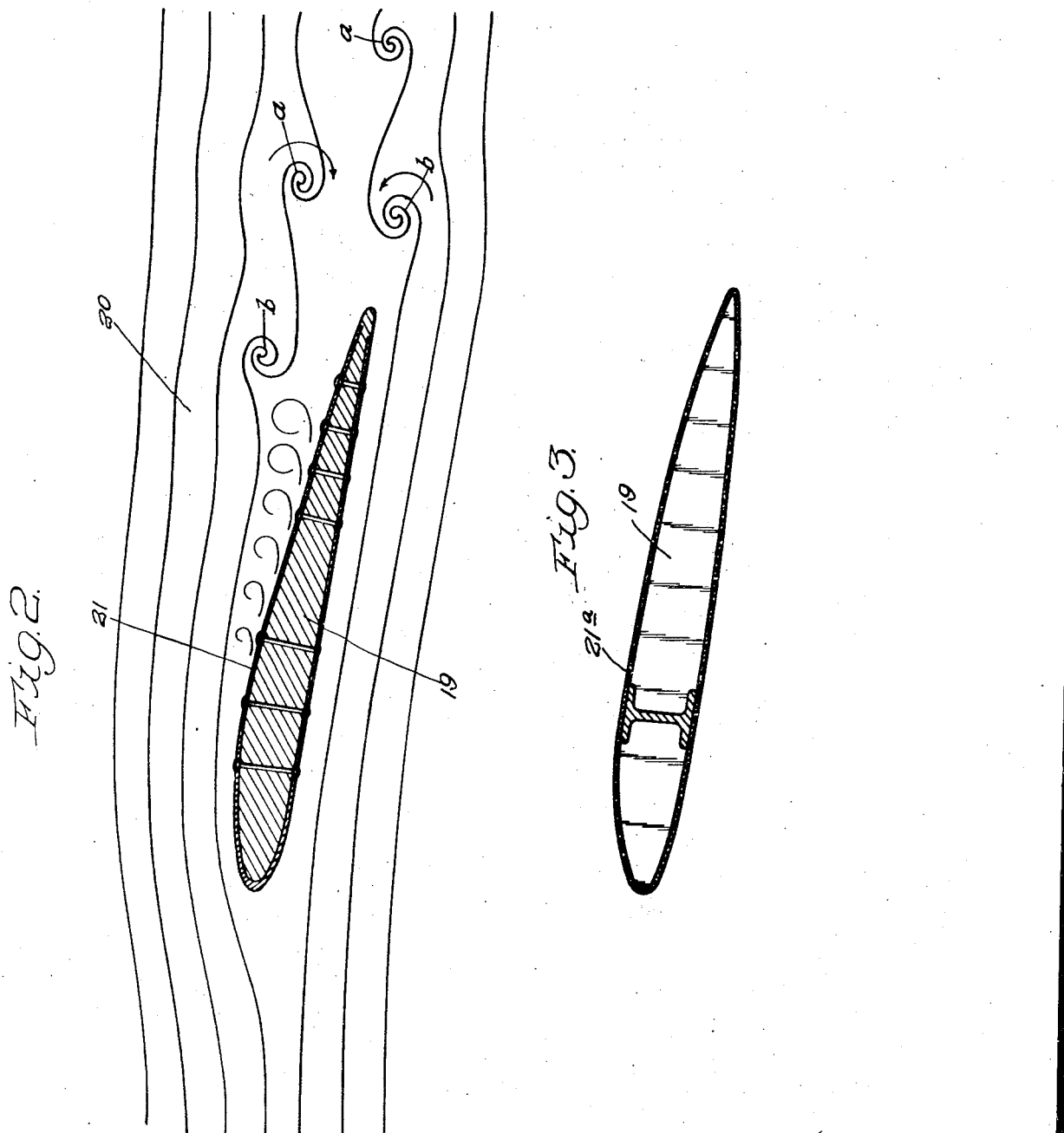

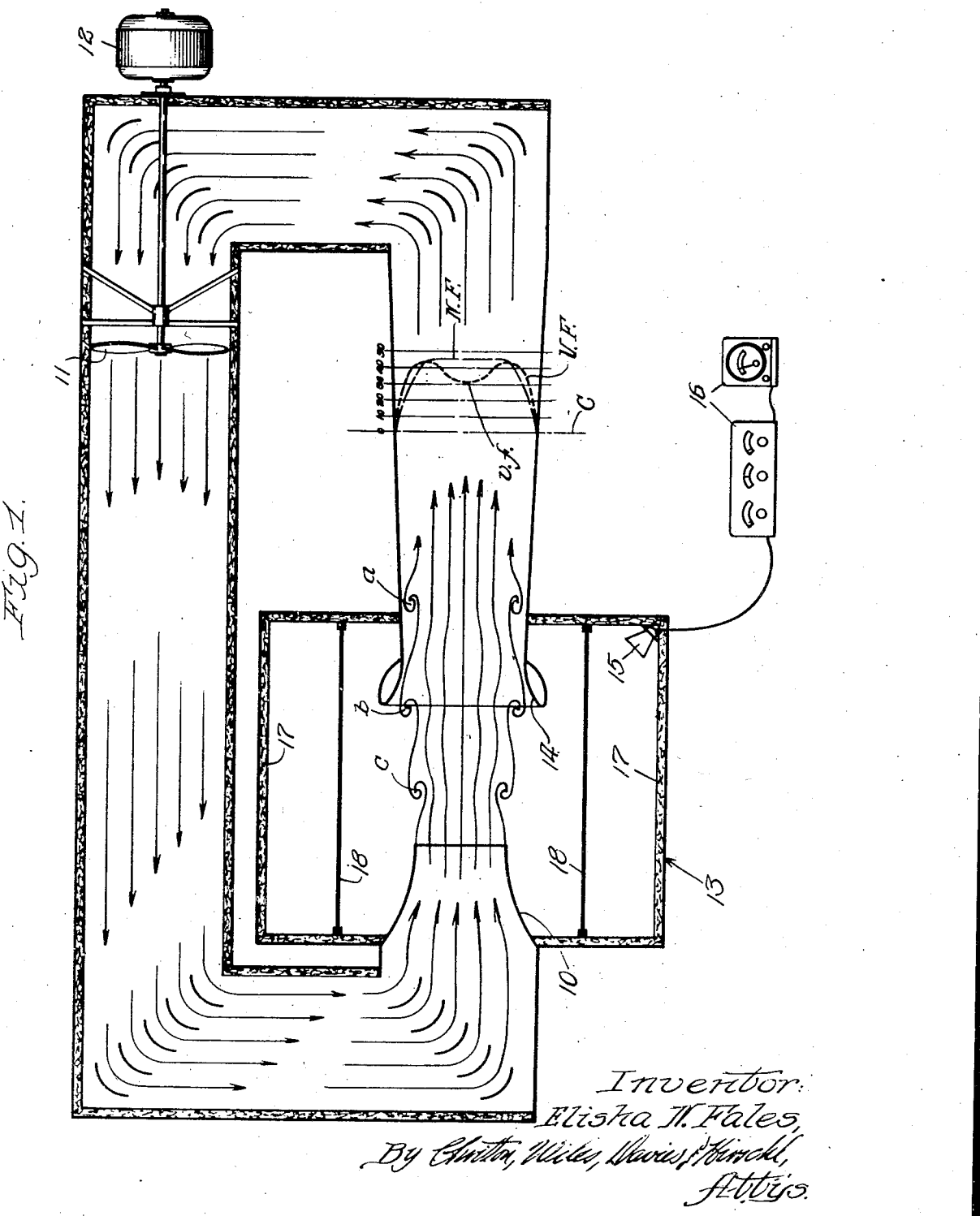

Sept. 7, 1948. E. N. FALES 2,448,966
CONTROL OF VORTEX FLOW BY PRESSURE WAVES
Filed Nov. 19, 1941 4 Sheets-Sheet 3
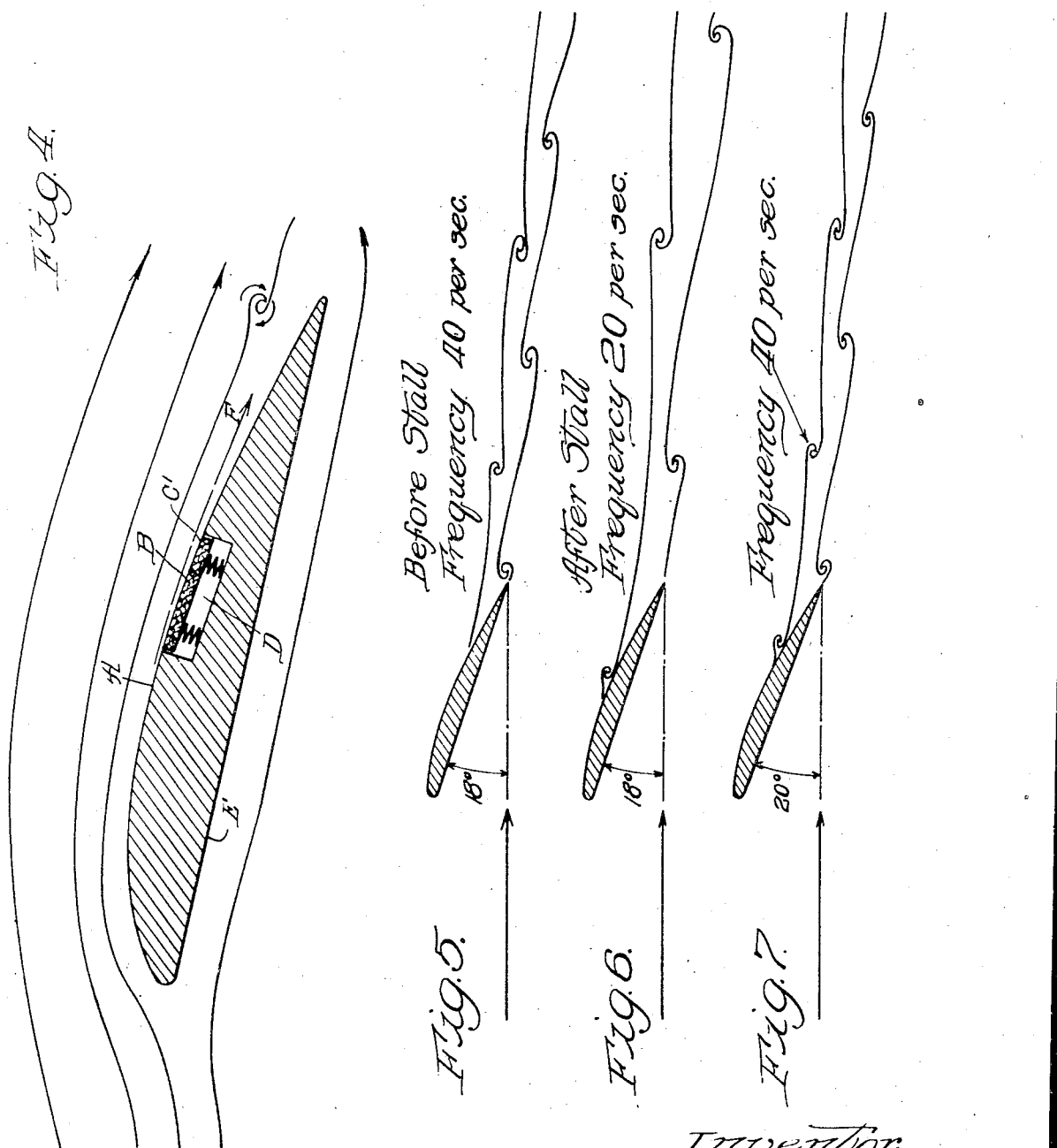

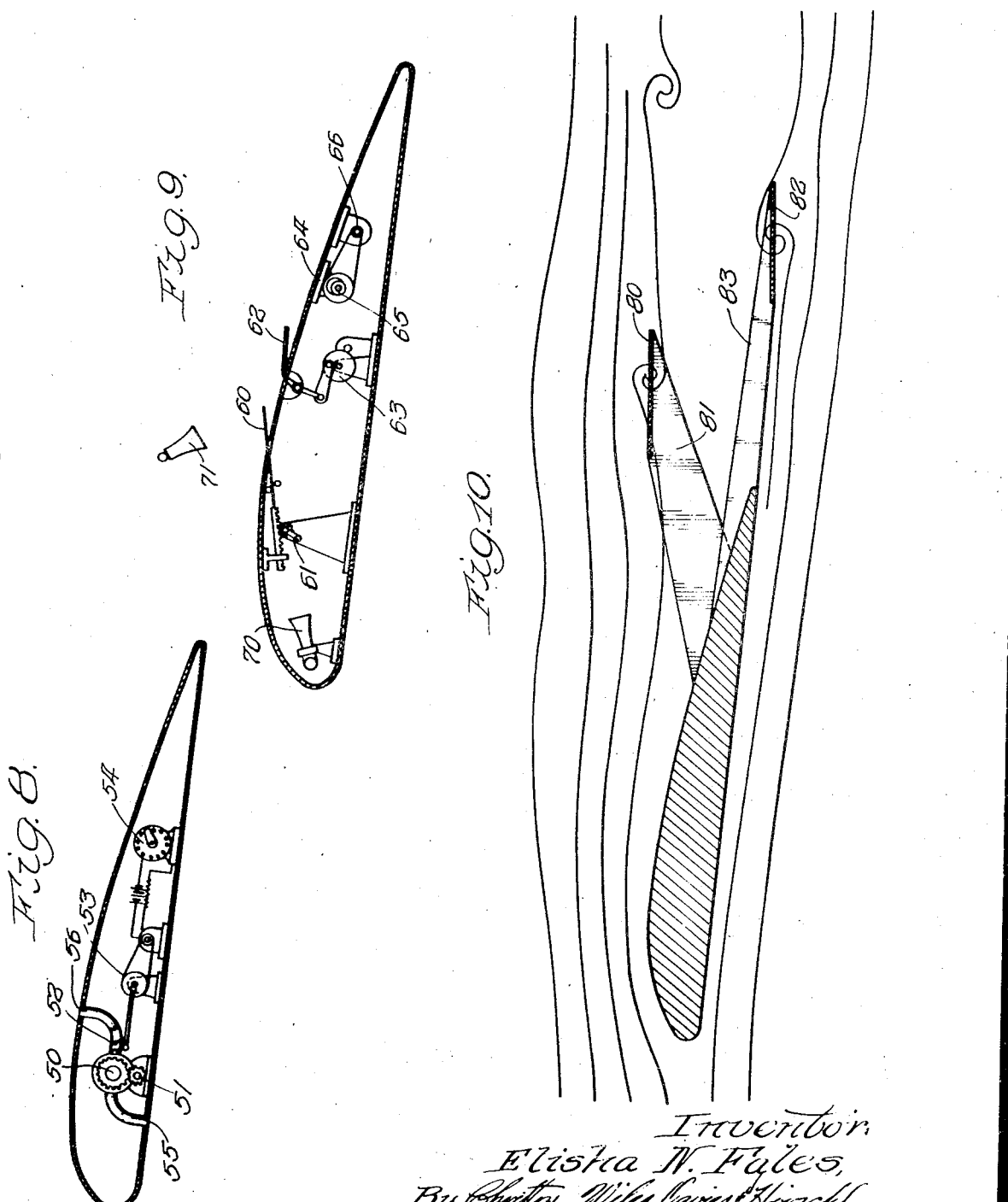

Patented Sept. 7, 1948

2,448,966

UNITED STATES PATENT OFFICE 2,448,966

CONTROL OF VORTEX FLOW BY PRESSURE WAVES

Elisha N. Fales, Washington, D. C.

Application November 19, 1941, Serial No. 419,809

8 Claims. (Cl. 73—147)

This invention relates to control of vortex flow by pressure waves and applies more particularly to method and apparatus for such control.

The invention has numerous applications in all fluids. For example, it may be utilized in connection with an airplane propeller where noise is created by periodic vortex-shedding from the blade. I have found that the intensity of the vortex formation may be altered by controlling the accompanying sound-pressure waves and that the noise created by the vortex-shedding may thus be controlled. As another example, I have found that in an open-jet wind tunnel, where vortex rings are formed surrounding the jet, the vortex intensity may be controlled by the creation or reduction of pressure waves, or the use of sound-absorbing or sound-reflecting material.

Other features and advantages of my invention will appear more fully as I proceed with my specification.

In the accompanying drawings I have shown diagrammatically in Fig. 1 an open-jet wind tunnel and in Figs. 2 and 3 cross-sections of airplane propeller blades or wings; Fig. 4 is a view of a propeller blade or wing with means for reducing the effect of air vibrations by covering a portion of the wing with sound-absorbent material; Figs. 5-7, inclusive, are views of an airfoil with means for controlling the vortex formation for the purpose of delaying the stalling of the airfoil; Figs. 8 and 9 are views of sections of an airfoil showing means for controlling vortex formation; and Fig. 10 is a view of an airfoil showing the use of a vane for delaying vortex formation.

As shown in the drawings, Fig. 1 illustrates diagrammatically an open-jet wind tunnel in which the jet is indicated by 10, the propeller by 11 and the motor by 12. 13 indicates the test chamber. The air flow is shown by the arrows and the vortex rings formed surrounding the jet are indicated diagrammatically at $a$, $b$, $c$, etc. 14 indicates the collector bell which the air stream and vortices enter as they leave the test chamber. C indicates a pressure traverse plane below the bell where the flow pattern is indicated, the lines 0, 10, 20, etc., indicating pounds per square foot velocity pressure.

The line VF indicates the flow pattern caused by the vortices when they are not suppressed. This pattern may be referred to as a vortical flow. It will be seen that there may be a very much reduced pressure area in the center of this pattern as indicated by $vf$, and an exaggerated pressure-area near the walls.

By the use of my invention the vortices can be controlled, suppressed or eliminated with the result that a normal flow pattern as indicated by the line NF may be produced. This may be referred to as normal flow.

This control of the vortices is accomplished, in general, by creating new pressure waves, or by absorbing or reflecting the pressure waves created by the vortices themselves.

For example, new pressure waves may be created by the loud speaker or oscillator 15 in the test chamber 13 operated by suitable apparatus 16. These pressure waves are adapted to be imposed upon the air stream. They may have a frequency producing sound, or the frequency of the same may be above or below the audible range. The vortices $a$, $b$, $c$, etc., also produce pressure waves having a frequency equal to the shedding frequency or nascent frequency of the vortices themselves. By creating new pressure waves with the loud speaker 15 of frequency related to that of the waves created by the vortices, but 180° out of phase with the same, I have found that the vortices can be eliminated or suppressed to such a degree that normal flow in the air stream is restored to show the normal flow of air pattern NF below the nozzle. On the other hand, if waves produced by the loud speaker 15 have the same frequency, but in phase, I have found that the distortion VF created by the vortical flow is increased.

I can also control the vortical flow, and pressure waves created thereby, by the use of sound-absorbent material 17 on the walls of the test chamber 13. I have found that if this is used, so that the pressure waves created by the vortices are absorbed and reflection reduced, the vortical effect is also reduced.

I have also found that by the use of removable baffles 18 in the test chamber the pressure waves created by the vortices may be reflected so as to augment or decrease the vortical effect. If these baffles are so placed that the pressure waves caused by the vortices are reflected back in phase or in resonance so that the intensity of the waves is increased, the vortical effect and the pattern VF will also be more pronounced. On the other hand, if the baffles 18 are so located that the reflected waves neutralize the issuing waves the pattern VF may be reduced and a more normal flow pattern established.

In Figs. 2 and 3 the invention is shown applied to a propeller blade or wing of an airplane. In these figures the blade or wing is illustrated by 19 and the air stream by 20. The vortices shed from the blade or wing and are again indicated by $a$, $b$, etc. Heretofore it has been found that the vortices produced by an airplane propeller often have an audible frequency causing objectionable noise and vibration. This can be controlled or eliminated by providing a sound-absorbing surface 21, or 21a on the blade. In Fig. 2 this surface is illustrated as being of some soft material. In Fig. 3 I have shown the use of small holes in the outer skin and sound-absorbing material located within the blade. It appears that without the use of sound-absorbing material, the pressure waves created by the vortices are augmented by reflection from the surface of the blade. By the use of sound-absorbing material, in the practice of my invention, this reflection is decreased so that such augmentation is prevented. This removes or eliminates the objectionable noise and vibration referred to. Since the intensity of pressure waves varies over different parts of the propeller blade, the sound-absorbent material will not necessarily be spread uniformly over the whole blade section, but may be concentrated at certain parts more than at others; or may be omitted entirely from parts of the blade. This is shown in Fig. 4 where air flow separation begins at some point A and air pulsations associated with separation and vortex formation affect blade predominantly at some point B, usually downstream of A. This invention seeks to modify transmission of the air vibration pressures to blade by applying to the part of blade most affected, a vibration absorbent B; this is a plate elastically supported in the blade recess so as not to interfere with proper airflow; or a sound-absorbing material located at B; or roughening on the blade surface such as to reduce impinging impulses.

I have found that vortices and their accompanying pressure waves are produced according to the formula $$f = m \frac{kV}{cS}$$

where:

$c$ is the ratio $$\frac{\text{Vortex spacing}}{S}$$

$m$ is a constant, depending on what kind of dimension $S$ be chosen, $f$ is frequency of vortex passage, $V$ is velocity of fluid striking object, $k$ is the ratio $$\frac{\text{vortex travel speed}}{\text{fluid flow speed}}$$

and $S$ is a linear dimension of stream or disturbed region involved in the vortex flow (i. e., jet-diameter, spacing between upper and lower vortex-chain, axial distance between two objects lying in the stream) or a function of a dimension of the object causing vortices.

In all cases where I speak of controlling, reducing or eliminating the pressure waves formed by the vortices, it is to be understood that this also results in control of, reduction or elimination of the vortices themselves. I have found that not only will control of the vortices control the pressure waves but that the reverse is also true.

If uncontrolled, some of the pressure waves from one vortex will travel to the point of vortex nascence where they will join with, and add to, the factors or conditions creating the succeeding vortices. The growth of the succeeding vortex is stimulated if sound waves from the preceding vortex arrive, with certain phase relations, while the second is being formed. The first vortex when it sheds or throws off its energy, sends out pressure waves which reach the point of origin to stimulate the new vortex and this is repeated in a never ending chain or cycle. By controlling the pressure waves of the first vortex, this additive or stimulating condition is eliminated, in the case of absorption, and, in the case of reflection, is not only eliminated but the waves of the first vortex are also used to neutralize (at least partially) the vortex forming conditions (by out-of-phase joining with the waves of the succeeding vortex) so as to suppress and partially eliminate the pressure waves of the succeeding vortex and thereby reduce the force of such vortex. On the other hand, reflection of the pressure waves in phase with the pressure waves of the nascent succeeding vortex will increase the pressure waves and hence the force of such vortex.

The invention may also be utilized for manipulation of the flow occurring about an airplane wing when the wing is near its stalling angle.

My vortex flow discovery makes clear that many vortex-formations depend on some kind of a pulsation stimulus to start each vortex; and that in the presence of such stimulus, considerable range of frequency may be had from the same flow, depending largely on what frequency the stimulus has.

In an airplane wing for which the pilot seeks slower and slower speed by bringing the wing-angle to a greater and greater value, at say 18°, the flow suddenly breaks or becomes discontinuous or stalls; after which the wing loses much of its lifting power. At the stalling angle the vortex pattern behind the wing appears to decrease its frequency, simultaneously increasing its dimension, to embrace a thicker wake and reduce the lift. Postponement of this stall will then be secured by imposing on the flow—by means of noise or other pressure-vibration—a frequency that will force the original high-lift pattern of vortices to continue, even when velocity drops quite low.

The above-mentioned flexibility of frequency of a vortex-chain is known to exist, and this flexibility conforms to the also known flexibility of the stalling-angle. Thus if the angle of attack be raised to 15°, 16°, 17°, 18°, 19°, 20°, until the flow breaks at 20°, then if the angle be reduced 20°, 19°, 18°, 16°, it will sometimes be found that the old original type of high-lift flow doesn't return until 16° has been reached. This hysteresis can be accounted for by flexibility of the vortex pattern, which shifts when some outside impulses reach it.

The impulses may (but not necessarily) be arranged so that their pressure front strikes the airfoil vortices athwart their length, i. e., loud-speaker waves for exciting fixed-frequency high-lift vortices over a wing would be directed toward the top, bottom, front or rear of the wing, not off one wing-tip directed along the trailing edge.

This is illustrated in Figs. 5–7 in which Fig. 5 shows the vortex-chain before the stall, Fig. 6 after the stall, and Fig. 7 the stalling angle extended to 20° by forcing the vortex frequency to hold at 40 per second. For example, in each of Figs. 5, 6 and 7 the speed of the wing is assumed to be 400 feet per second. With the 18° angle the frequency of the vortices may be 40 per second. It has been found that after the stall the frequency may be reduced to 20 per second as shown in Fig. 6. It will be noted that the distance between vortices, and that of the wake-thickness is twice as great in Fig. 6 as in Fig. 5. By forcing the vortex frequency to hold at 40 per second as shown in Fig. 7 the stalling angle may be extended to 20°.

Various means may be employed for creating pressure impulses such as periodic air jets operating in the region of the nascence point of vortices; periodic suction or compression impulses; sound waves; wind-actuated fluttering devices of controllable frequency; mechanically operated air-flow interrupter to cause periodic pressure changes; or bodily vibrations of the fluid-struck body.

For example, as illustrated in Fig. 8 there may be located inside of the aero- or hydro-foil a suction or pressure pump 50 driven by a motor 51 having a valve 52 controlled by a motor 53 which in turn is controlled by mechanism 54 (indicated merely diagrammatically) to open and shut 52 at any desired frequency. 55 indicates the air inlet for the pump and 56 the jet nozzle or suction orifice.

As shown in Fig. 9 the aero- or hydro-foil is equipped with a vane 60 which flutters in the wind at a period controlled by a crank and pinion 61 which adjusts the free length and therefore the vibration period of the vane which in turn controls the vortex periodicity. This view also shows an interrupter or pressure-impulse exciter 62 with a variable speed drive 63. In the same view I have also illustrated a vibrator 64 operated by a rotatable eccentric 65 driven by a motor 66 at any desired frequency. The vibrator vibrates the airfoil skin, under which it is located, and sets up pressure waves of any desired frequency that can be employed to control the vortex formation. In Fig. 9 I have also shown that the vortex formation in connection with such an aero- or hydro-foil can be controlled by a loud speaker emitting pressure waves at any desired frequency. Such loud speaker may be located inside of the foil as indicated by 70 or outside as indicated by 71.

In Fig. 10 I have shown an airfoil equipped with a vane. Such a vane is located as indicated by 80 carried by the support 81 or may be lower and behind the foil as indicated by the vane 82 carried by the support 83. In each case the vane is located approximately where the vortex formation is at a nascent condition. The fluid flow around the airfoil causes the vortex. The vortex formation is hindered by supporting one or more vanes edgewise to the stream flow as obstacles to the rotary fluid motion. Such vanes are indicated by 80 and 82 and are preferably located, as stated above, substantially where the vortex formation is at a nascent condition.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new and desire to secure by Letters Patent is:

1. The method of reducing the intensity of vortices in fluid flowing under such conditions that vortices are formed, comprising causing pressure waves originating in said vortices to impinge upon surfaces so located as to reflect portions of said waves to the point of origin of and in out-of-phase relation to the vortices being formed by the conditions creating such vortices.

2. The method of reducing the intensity of vortices in air in a wind tunnel wherein a stream of air flows into a body of relatively still air in a test chamber and vortices are formed and move along in the direction of movement of said stream, comprising causing pressure waves originating in said vortices to impinge upon a reflecting surface outside of the path of movement of the vortices so located as to reflect portions of said waves to the point of origin of and in out-of-phase relation to the vortices being formed, whereby such waves are prevented from aiding the conditions creating succeeding vortices.

3. The method of reducing the intensity of vortices in air in a wind tunnel wherein a stream of air flows into a body of relatively still air in a test chamber and vortices are formed and move along in the direction of movement of said stream, comprising causing pressure waves originating in said vortices to impinge upon an absorbent surface ouside of the path of movement of the vortices, whereby substantially all of the portions of said waves which would aid the conditions creating succeeding vortices are absorbed.

4. The method of reducing the intensity of vortices in fluid where the conditions are such that relative movement between substances, at least one being said fluid creates vortices which move in a certain path and originate pressure waves which are adapted to aid the conditions creating succeeding vortices, comprising causing said pressure waves to impinge upon a reflecting surface ouside of the path of movement of the vortices so located as to reflect portions of said waves to the point of origin of and in out-of-phase relation to the vortices being formed, whereby such waves are prevented from aiding the conditions creating succeeding vortices.

5. The method of reducing the intensity of vortices in fluid where the conditions are such that relative movement between substances, at least one being said fluid, creates vortices which move in a certain path and originate pressure waves which are adapted to aid the conditions creating succeeding vortices, comprising causing said pressure waves to impinge upon an absorbent surface outside of the path of movement of the vortices, whereby substantially all of the portions of said waves which would aid the conditions creating succeeding vortices are absorbed.

6. A wind tunnel of the character described, including: a test chamber; a jet opening into said test chamber; an exit opening opposite said jet; means for causing air to stream out of said jet, across said chamber and through said opening under conditions such that vortices are formed and move along in the direction of movement of said stream and originate pressure waves which are adapted to aid the conditions creating succeeding vortices; and a member in said chamber outside of the path of movement of the vortices having a reflecting surface adapted to have said pressure waves impinge thereon and so located as to reflect portions of said waves to the point of origin of and in out-of-phase relation to the vortices being formed, whereby such waves are prevented from aiding the conditions creating succeeding vortices.

7. A wind tunnel of the character described, including: a test chamber; a jet opening into said test chamber; an exit opening opposite said jet; means for causing air to stream out of said jet, across said chamber and through said opening under conditions such that vortices are formed and move along in the direction of movement of said stream and originate pressure waves which are adapted to aid the conditions creating succeeding vortices; and a member in said chamber outside of the path of movement of the vortices having an absorbent surface adapted to have said pressure waves impinge thereon whereby substantially all of the portions of said waves which would aid the conditions creating succeeding vortices are absorbed.

8. The method of reducing the intensity of vortices in fluid where the conditions are such that relative movement between an object and said fluid creates vortices which move in a certain path and originate periodic pressure waves according to the formula $$f = m\frac{kV}{cS}$$

where:

$c$ is the ratio $\frac{\text{Vortex-spacing}}{S}$ $m$ is a constant, depending on what kind of dimension S be chosen,
$f$ is frequency of vortex passage,
$V$ is velocity of fluid striking object,
$k$ is the ratio $\frac{\text{Vortex travel speed}}{\text{Fluid flow speed}}$ S is a linear dimension of stream or disturbed region involved in the vortex flow (i. e., jet-diameter, spacing between upper and lower vortex-chain, axial distance between two objects lying in the stream) or a function of a dimension of the object causing vortices, comprising causing said pressure waves to impinge upon a reflecting surface outside of the path of movement of the vortices so located as to reflect portions of said waves to the point of origin of and in out-of-phase relation to the vortices being formed, whereby such waves are prevented from aiding the conditions creating succeeding vortices.

ELISHA N. FALES.

REFERENCES CITED

The following references are of record in the file of this patent:

UNITED STATES PATENTS

| Number | Name | Date |
|---|---|---|
| 1,364,197 | Heath | Jan. 4, 1921 |
| 1,552,112 | Clark | Sept. 1, 1925 |
| 1,704,612 | Johnson | Mar. 5, 1929 |
| 1,719,293 | Gripon | July 2, 1929 |
| 1,811,364 | Olshevsky | June 23, 1931 |
| 1,815,124 | Sperry | July 21, 1931 |
| 1,880,207 | Lougheed | Oct. 4, 1932 |
| 1,903,823 | Lougheed | Apr. 18, 1933 |
| 1,909,186 | Lougheed | May 16, 1933 |
| 1,922,311 | Lougheed | Aug. 15, 1933 |
| 1,971,124 | Swan et al. | Sept. 11, 1934 |
| 2,071,012 | Adams | Feb. 16, 1937 |
| 2,074,201 | Bechereau | Mar. 16, 1937 |
| 2,078,854 | Jones | Apr. 27, 1937 |
| 2,122,447 | Zand | July 5, 1938 |
| 2,123,096 | Charpentier | July 5, 1938 |
| 2,164,721 | Price | July 4, 1939 |
| 2,169,325 | Novak | Aug. 15, 1939 |
| 2,252,256 | Harris | Aug. 12, 1941 |
| 2,297,046 | Bourne | Sept. 29, 1942 |
| 2,297,269 | Wendt et al. | Sept. 29, 1942 |
| 2,333,449 | Stahl | Nov. 2, 1943 |

FOREIGN PATENTS

| Number | Country | Date |
|---|---|---|
| 482,902 | Germany | Sept. 24, 1929 |
| 505,433 | Great Britain | May 5, 1939 |